United States Patent [19]

Adam

[11] 4,355,713
[45] Oct. 26, 1982

[54] DEVICE FOR LIFTING AND LOADING BOXES AND CARTONS, ESPECIALLY FROM AN AGRICULTURAL FIELD

[76] Inventor: Richard E. Adam, 914 E. Hermosa, Santa Maria, Calif. 93454

[21] Appl. No.: 239,679

[22] Filed: Mar. 2, 1981

[51] Int. Cl.³ ............................................. B65G 65/02
[52] U.S. Cl. ..................................... 198/514; 198/518
[58] Field of Search ............... 198/512, 518, 514, 300; 414/502

[56] References Cited

U.S. PATENT DOCUMENTS

| | | | |
|---|---|---|---|
| 2,367,970 | 1/1945 | Smoker | 198/512 X |
| 2,565,548 | 8/1951 | Cordes | 198/624 X |
| 2,622,550 | 12/1952 | Ritchie | 198/624 X |
| 2,688,392 | 9/1954 | Dion | 198/598 X |
| 3,521,734 | 7/1970 | Kerber, Jr. | 198/512 X |
| 3,670,869 | 6/1972 | Dimmock | 198/637 X |
| 3,923,169 | 12/1975 | Van Drie | 198/518 X |
| 4,185,731 | 1/1980 | Van Drie | 198/518 X |

FOREIGN PATENT DOCUMENTS 2829155  1/1980  Fed. Rep. of Germany ...... 198/518

Primary Examiner—Joseph E. Valenza
Assistant Examiner—D. Williamson
Attorney, Agent, or Firm—Owen, Wickersham & Erickson

[57] ABSTRACT

Apparatus for lifting produce-filled cartons from an agricultural field. A main frame has a pickup device at its forward end, comprising a pair of rotating facing discs on two generally vertical converging planes with high friction faces for engaging the carton side walls. A gripping device behind the pickup device comprises a substantially coplanar pair of rotatable yieldable tired wheels facing each other and inclined rearwardly upwardly, the tires providing high friction surfaces for engaging the carton side walls. The gripping device is located so that it positively takes away the carton from the pickup device and supports it while conveying it rearwardly and upwardly to a conveyor means that moves the carton upwardly and rearwardly therefrom.

15 Claims, 9 Drawing Figures

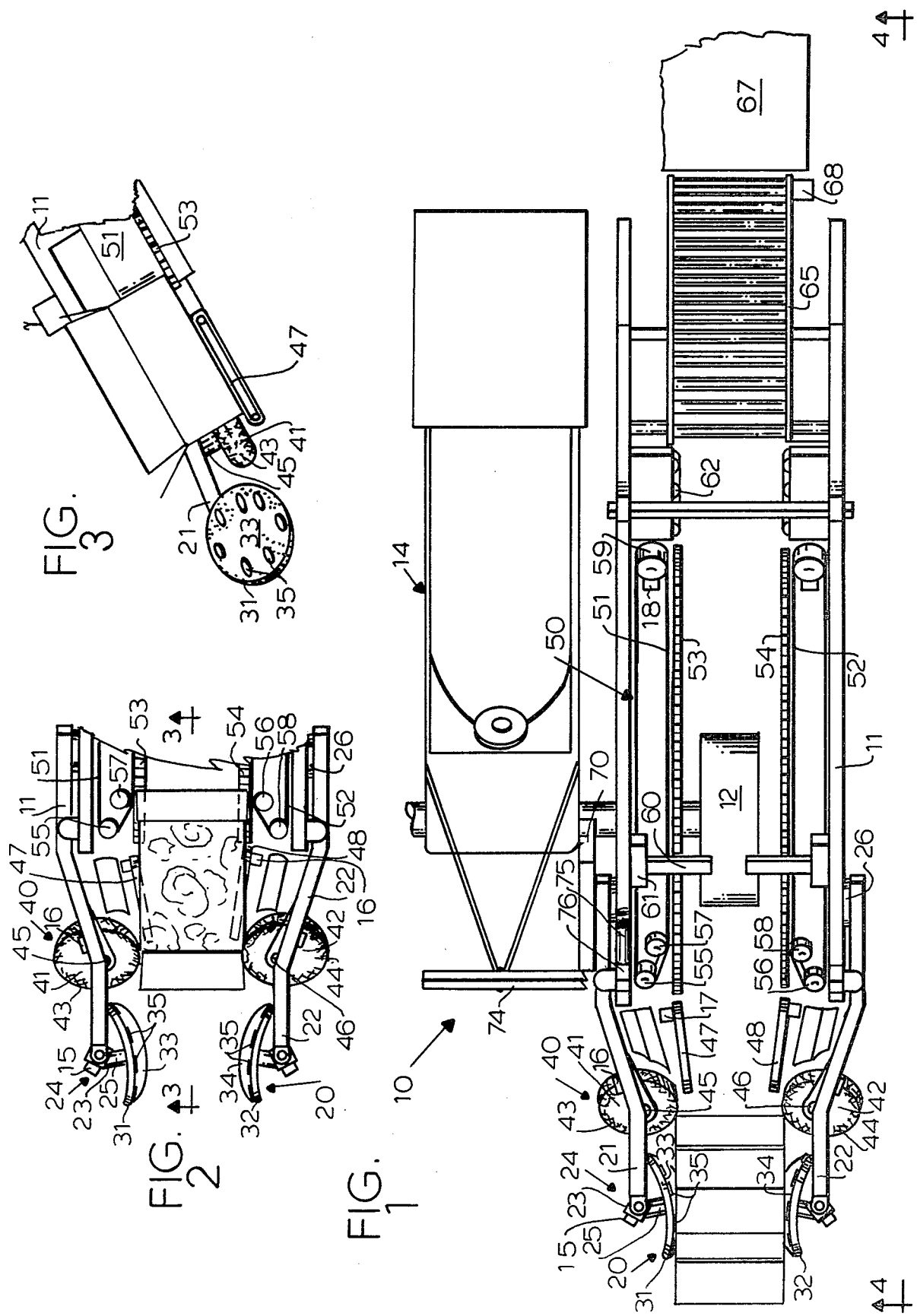

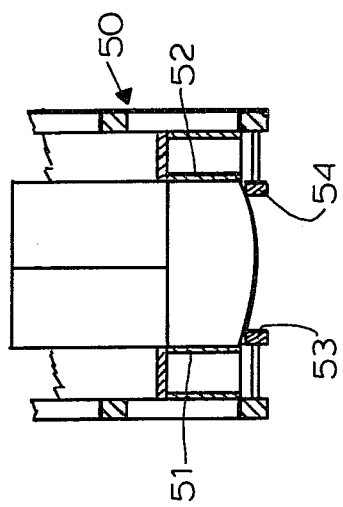
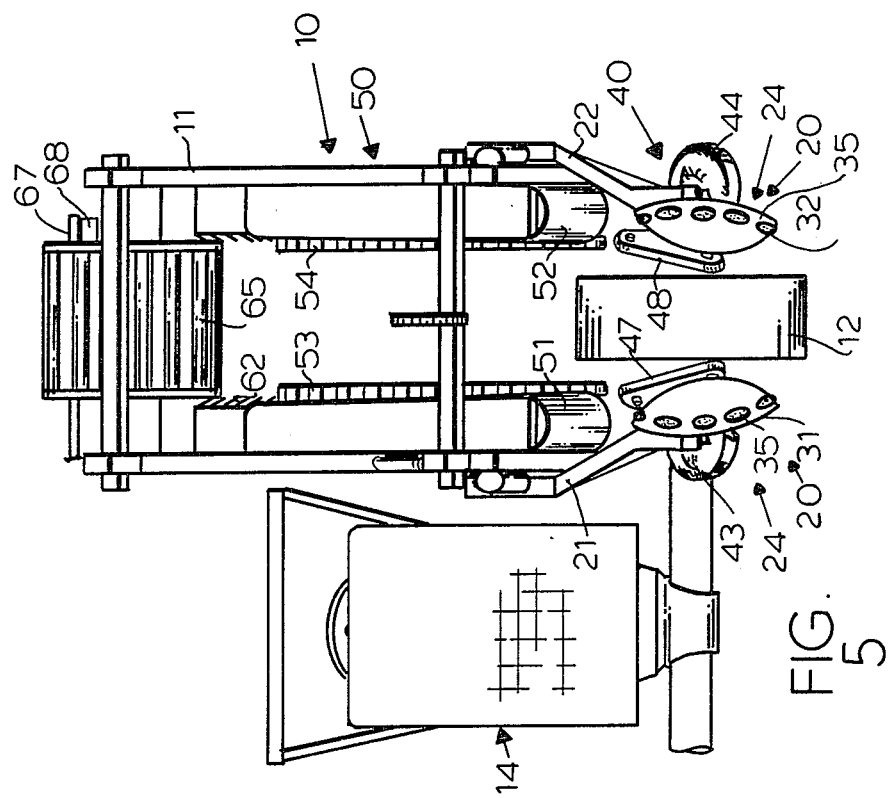
FIG. 6
FIG. 5

4,355,713

DEVICE FOR LIFTING AND LOADING BOXES AND CARTONS, ESPECIALLY FROM AN AGRICULTURAL FIELD

This invention relates to apparatus and method for lifting and loading filled boxes and cartons, especially from agricultural fields.

BACKGROUND OF THE INVENTION

Many crops, such as lettuce, are packed into cartons or boxes in the field immediately after being severed from the roots. Then a tractor-trailer rig is driven through the field, and the cartons are loaded onto it. Heretofore, each carton has been individually lifted manually by a man who walks through the field along with the tractor-trailer rig, picks up each carton, lifts it high, and puts it on the trailer. The cartons may be four to eight high or higher in the trailer, and it requires considerable effort to lift the upper cartons up high onto the top of the stack. Not only is the work demanding and tiring, but the overall system is very inefficient and slow, since the machine can move no faster through the field than the time it takes the loaders to walk along and lift the cartons. This usually means a lot of stopping and starting, and it also has resulted in many back injury claims.

In spite of these difficulties and the impetus that these difficulties have given to developing something better, there has as yet been no machine able to accomplish this work satisfactorily. One of the problems is that agricultural fields are by no means completely smooth, for picking up a filled box or carton from a level floor is quite different from picking up a filled carton from a field in which the carton is not really completely horizontal and vertical and is rarely disposed along a straight line. The only certainty is that boxes or cartons in a field will be disposed at different angles to a plane, will be only roughly aligned, and will sit at an angle, inclined one way or another according to where it is located on the uneven field.

On a completely level surface, it is often feasible for a machine to project a scoop-like member under the carton, or to place each box or carton on a pallet and use a pallet-type loader. However, in the field, pallets are only an additional inconvenience that are usually not only undesirable but even positively interfere with efficiency, while it is not at all feasible to rely on slipping a thin flat member under a carton or box.

SUMMARY OF THE INVENTION

The present invention comprises a machine which can move at a substantially constant rate through the field along a row of filled cartons or boxes and can pick them up. To do this, it employs an initial pickup device at its forward end, comprising a pair of inclined discs provided with suitable friction material that grasp the sides of the carton. These discs are driven to rotate so as to lift the carton upwardly and rearwardly and pass it on to a second gripping device, comprising a pair of horizontal facing wheels which obtain even better traction on the side of the carton, strip it from the inclined discs, and in turn deposit it on to a suitable conveyor system.

A conveyor system that is particularly useful with the style of carton that is intended to sag somewhat, comprises vertical conveyor belts along each side that engage the carton ends and squeeze it somewhat between them. These vertical belts are preferably employed in combination with a set of rollers, each mounted generally horizontally near the outside edges of the carton on which bottom margins of the carton can rest while the carton is being moved upwardly and rearwardly. Another system for other types of cartons uses a single flat belt or rod conveyor, which supports the bottom of the carton and moves the carton rearwardly and upwardly.

It is desirable that the cartons be conveyed through a flap closing device and to a stapler or gluer at or near the rear of the machine, but specific closing devices and stapling or glues are not essential parts of the present invention, which relates to the actual picking up, lifting, and upward and rearward conveying of the filled cartons.

BRIEF DESCRIPTION OF THE DRAWINGS

FIG. 1 is a top plan view of apparatus for picking up cartons in the field, according to the invention, and for depositing them on a suitable loading truck.

FIG. 2 is an enlarged fragmentary view of the front portion of FIG. 1 looking along the line 2—2 FIG. 1.

FIG. 3 is a view in side elevation of the portion shown in FIG. 2 of FIG. 1.

FIG. 5 is a view in front elevation of the device of FIG. 1 with the view broken off at one side so as to omit the showing of the following trailer.

FIG. 6 is a view in section taken along the line 6—6 in FIG. 4.

DESCRIPTION OF THE PREFERRED EMBODIMENTS

The Device of FIGS. 1-6

Figure 4:
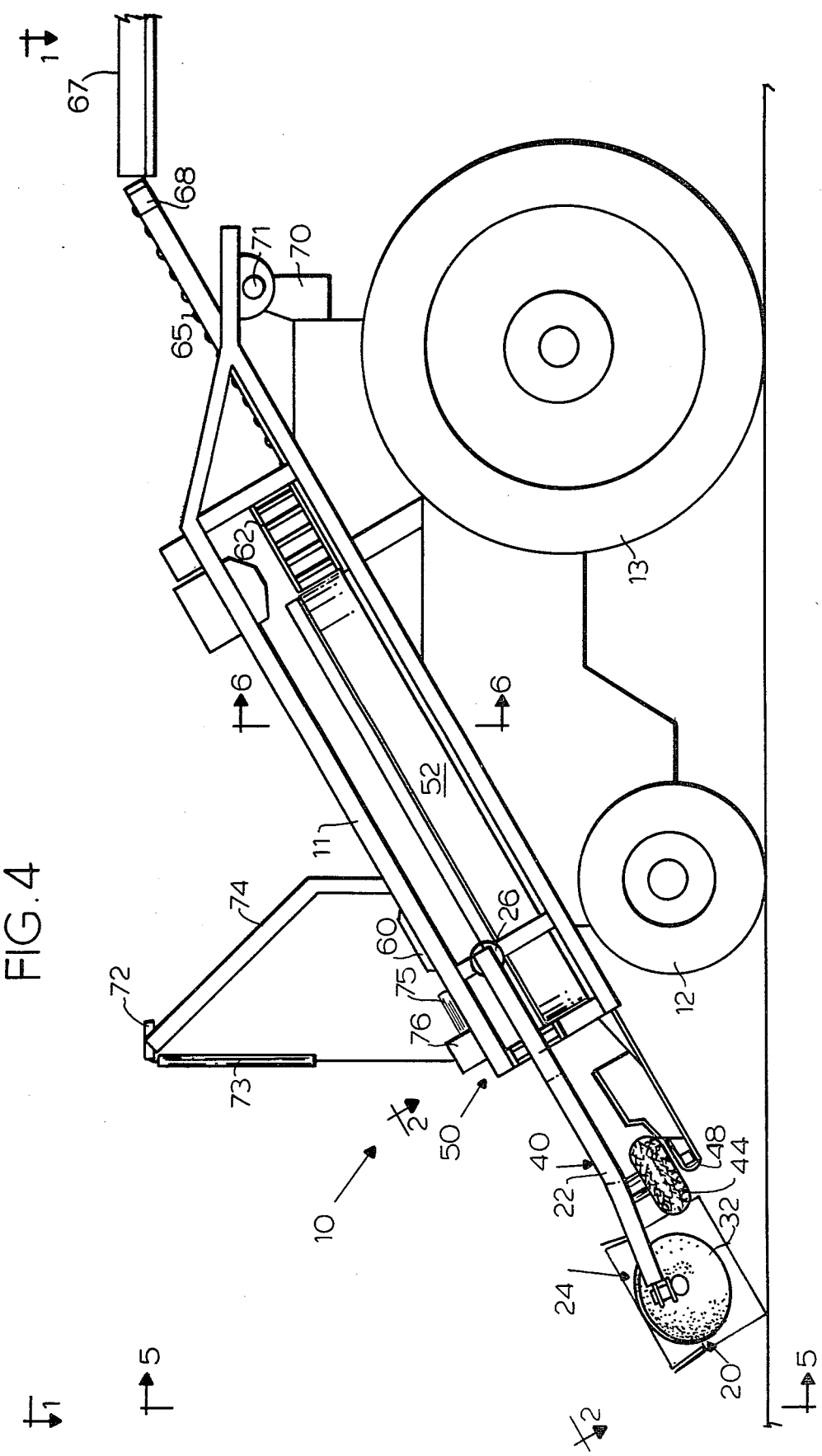
FIG. 4 is a view in side elevation of the device.

One pickup and loading device 10 embodying the principles of the invention is shown in FIGS. 1-6. It comprises a main frame 11 supported indirectly on one or two front wheels 12 and rear wheels 13. The device 10 may include a suitable engine for providing for forward movement of the apparatus 10 through the field, or the device 10 may be attached to a self-powered tractor 14. Hydraulic motors 15, 16, 17, and 18 may supply the power needed for driving the pickup, gripping, and conveying apparatus, or electric motors or other power devices may be used.

At the forward end of the main frame 11 is a pickup device 20 comprising two forwardly extending frame arms each mounted on a pivot 23 supported by the frame 11. These arms 21 and 22 at their forward end provide respective assemblies 24 that include stub shafts 25 that are driven to rotate by the hydraulic motor 15. The forward ends are urged to each other by yielding arms, such as a spring or, as shown, an air bag 26 located between the rear end of each arm 21 and 22 and the frame 11. The stub shafts 25 are mounted at an angle and support a pair of discs 31 and 32 which are thereby mounted at an angle, so as to be able to guide a carton in between them at their forward end and then embrace it tightly at the rear without squeezing it too tightly, the tight embrace being provided by the air bag 26 or other suitable resilient means.

On facing inner surfaces 33 and 34 of these discs 31 and 32, which are preferably dished to be convex inwardly, are provided suitable high-friction engagement elements 35. These elements 35 may include a series of thin discs of anti-friction material such as tire rubber, adhesively secured or otherwise held to the main disc 31, 32 or they may provide a continuous ring of such material, or other suitable means for insuring nonskid engagement with the carton walls. For example, the discs 31 and 32 may be made to have faces 33, 34 of nonskid material or even each entire disc may be made of such material. The discs may actually be wheels like automobile wheels with rubber tires performing the function of the disc 35 (see FIGS. 7-9). The facing discs 31 and 32 are thus supported for rotation on two intersecting generally vertical planes that converge rearwardly and downwardly. Looking towards each disc from its outside, the rotation will be counterclockwise. The discs 31 and 32 are spaced apart from each other a distance such that at their forward and upper portions they are substantially further apart than the width of the carton they are to lift, and at their rear and lower portion they are somewhat closer together than the width of the carton, but yield to outward pressure. The frame members 21 and 22 support the discs 31 and 32 well above ground level, so as to engage the cartons preferably about two inches below the score line for the top flaps, more than halfway up their side walls. The diverging forward portions of the discs 31 and 32 guide each filled carton into the space between them and straighten it so that it will be lifted substantially evenly. As shown in FIGS. 1 and 4, the pickup device 20 lifts the carton off the ground, tilts it rearwardly, and raises it more while passing it rearwardly. The divergencies upwardly help assure release of the carton when it has been lifted. The two hydraulic motors 15 are set to rotate the discs 31 and 32 somewhat faster than the ground speed of the tractor 14.

To the rear of this pickup device 20 is an intermediate gripping device 40 for stripping the carton from the pickup device, conveying the carton rearwardly, and depositing it on a conveyor system 50. This device 40 may comprise a pair of wheels 41 and 42 having tires 43, 44 that may be standard automobile or truck tires with a good tread and low inflation, preferably to provide a good friction surface with more resilient yielding. The wheel 41 and 42 may be mounted on stub shafts 45 and 46 that are inclined to the vertical and are supported by the frame members 21 and 22, so that the wheels 41 and 42 are substantially coplanar and are inclined upwardly towards the rear at an angle corresponding to that at which the carton is being conveyed. They may be driven by separate hydraulic motors 16 at a speed identical to or, preferably, somewhat faster than the discs 31 and 32. This gripping devise 40 takes over from the pickup devices and assures positive seizure of the carton away from the discs 31 and 32. It also supports the carton usually at about halfway up or a little down (see FIGS. 2 and 3) while moving it upwardly and rearwardly, and it then deposits the carton onto the conveyor system, preferably via a pair of rearwardly diverging and upwardly inclined conveyor belts 47 and 48. These belts 47 and 48 are long enough to assure that the carton will rest on top of them and not be held up above them. The belts 47 and 48 are preferably driven at the same speed as the wheels 41 and 42 by two hydraulic motors 17. The divergencies assure initial capture of the cartons and smooth transfer to the main conveyor system 50.

The conveyor system 50 may comprise a pair of vertically mounted and rearwardly upwardly inclined belt conveyors 51 and 52 that engage the opposite sides of the carton, in conjunction with a pair of narrow roller tracks 53 and 54, also upwardly and rearwardly inclined, that support the bottom of the carton at marginal areas very near the side edges, preferably about one or two inches away from the belts 51 and 52.

The forward ends of the belts 51 and 52 are spaced apart by idler rollers 55 and 56, so that the box or carton can easily enter in between them. To the immediate rear of this forward mouth portion are rollers 57 and 58 that guide the belts 51 and 52 to engage the carton walls snugly. At the upper end, drive rollers 59 are driven by the hydraulic motor 18.

FIG. 1 shows that one of the ground engaging wheels 12 projects up below the conveyor 50, but this wheel 12 does not make contact with the carton, as can be seen from FIG. 4, lying well below the conveyor 50 and out of contact with the carton.

While the two side conveyors 51 and 52 carry the carton upwardly and rearwardly, the carton preferably passes through a flap-closing device 60 of conventional type. The flap-closer 60 may be actuated by the carton engaging a microswitch 61. Just beyond the conveyor 50 may be a series of rollers 62 to support the carton while the top flaps are stapled or glued to lock them in place. The next carton pushes the stapled or glued carton onto another conveyor 65, which may be of the belt type driven by a hydraulic motor 66. This in turn delivers the carton to a conveyor 67, which may be a cross conveyor, a side delivery conveyor, or a rear conveyor, for depositing the boxes into a truck or trailer behind or to one side of the loader 10 with or without the help of a individual. Various transfer devices may be used.

The frame 11 itself is secured to a vehicle frame 70 at a pivot 71, the forward end of the frame 11 and the arms 21 and 22 can be raised or lowered by an hydraulic device 72 with a cylinder 73 secured to a derrick arm 74 extending up from the frame 70 and a piston rod 75 secured to a frame bracket 76 on the frame 11.

Figure 7:
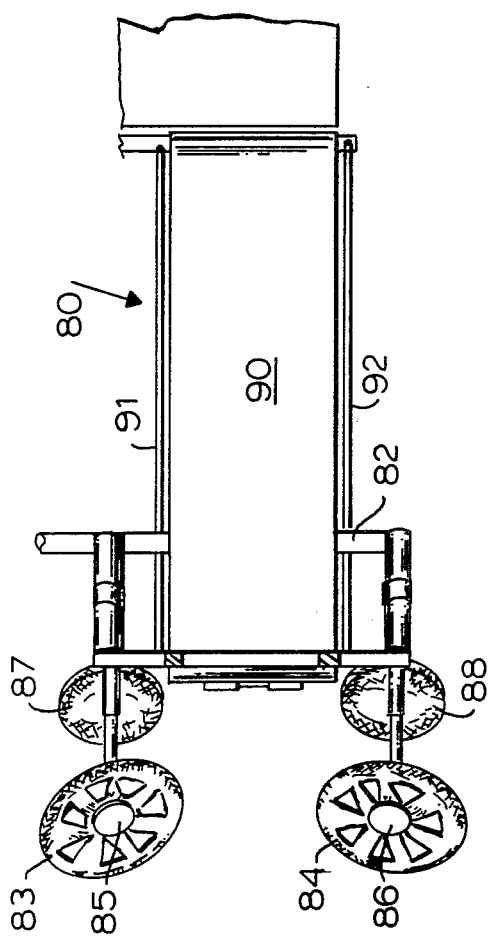
FIG. 7 is a top plan view, somewhat diagrammatic, of the forward portion of a modified form of the invention.
Figure 8:
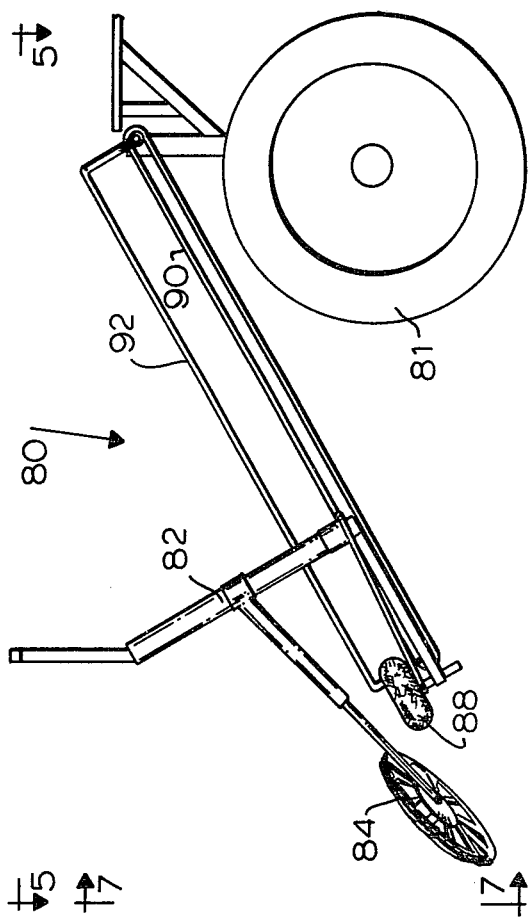
FIG. 8 is a view in side elevation of the device of FIG. 7.
Figure 9:
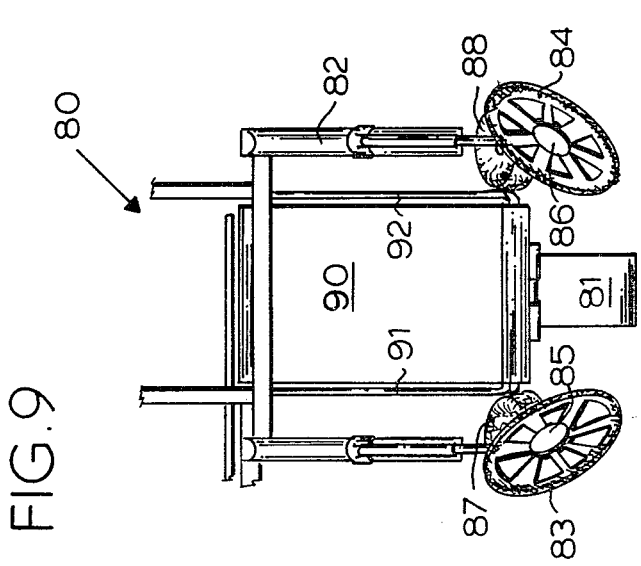
FIG. 9 is a view in front elevation of the device of FIGS. 7 and 8.

The device of FIGS. 7-9

The device of FIGS. 7-9 illustrates some alternative ways of accomplishing basically the same thing. Some features of it may be better adapted to some cartons and some of its features may be combined with others of the earlier-described device of FIGS. 1-6.

Once again, there is a forward moving apparatus 80 with ground-engaging wheels 81 and a main frame 82. At the forward end of the frame 82 are a pair of discs 83 and 84, which may be automobile wheels with suitable tires. These wheels 83 and 84 correspond to the discs 31 and 32 and are inclined at the same or a similar angle, as shown, so as to yieldingly engage the side wall of the carton with their inner walls 85 and 86, thereby lifting the carton and passing it on to a pair of automobile or truck tired wheels 87 and 88, where the tire treads yielding engage the side of the carton in substantially the same manner as that described earlier. The wheels 87 and 88, then pass the carton on to a belt conveyor 90, on which the bottom of the carton rests, and the carton is then conveyed upwardly and rearwardly by the belt conveyor 90, preferable with suitable side guides 91 and 92, until it reaches a suitable height. The flap-closing and locking devices may be disposed whereever suitable, as may a loading conveyor.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sence limiting.

I claim:

1. Apparatus for lifting filled parallelepiped cartons with vertical side walls from an argicultural field, or the like, including in combination:

a wheel-supported main frame, a pickup device at the forward end of said frame comprising a pair of facing discs supported for rotation on two generally vertical planes that converge rearwardly and downwardly, said discs being spaced apart from each other a distance such that at their forward and upper portions they are further apart than the width of the carton to guide it into the space between them and, later, to enable release from them, and at their rear and lower portions they are slightly closer together than the width of the carton, to grip it, said discs having high friction faces for engaging said carton side walls, first driving means supported on said frame for rotating said discs, a gripping device supported by said frame to the rear of said pickup device and comprising a substantially coplanar pair of rotatable yieldable tired wheels facing each other and inclined rearwardly upwardly and slightly closer together than the width of the carton, the tires providing high friction surfaces for engaging the carton side walls and yielding to prevent damage to the carton while gripping them firmly, the gripping device being located so that it positively takes away the carton from the pickup device and supports it while conveying it rearwardly and upwardly, second driving means supported on said frame for rotating said wheels so that their facing surfaces move upwardly and rearwardly, and conveyor means on said frame for receiving said carton from said gripping means and moving the carton upwardly and rearwardly therefrom.

2. The apparatus of claim 1 wherein said pickup device comprises a pair of frame arms pivotally mounted to said main frame and supporting said discs for rotations and resilient means between said frame arms and said main frame for yieldingly urging said discs towards each other.

3. The apparatus of claim 1 wherein said resilient means comprise air bags on the opposite side of said pivots from said arms.

4. The apparatus of claim 1 wherein said discs are solid dished plates and said high friction faces comprises a series of rubber discs mounted thereon.

5. The apparatus of claim 1 wherein said discs are wheels equipped with tires, the side surfaces of which serve as said high friction faces.

6. The apparatus of claim 1 wherein said tired wheels are filled with air at low pressure to provide said yielding.

7. The apparatus of claim 1 wherein said conveyor means comprises a rearwardly and upwardly inclined pair of vertical belts, each engaging an opposite side wall of said carton, and a supporting pair of narrow roller tracks also inclined upwardly and rearwardly and supporting a marginal portion of the bottom of the carton along each side thereof.

8. The apparatus of claim 7 wherein the belts are spread apart at their forward ends to enable entrance and alignment of the cartons.

9. The apparatus of claim 7 having transition support means between said tired wheels and said conveyor means, comprising a pair of narrow, diverging driven conveyor belts for supporting portions of the bottom of the carton and guiding it up to said roller tracks, the space above said belts being open to enable said carton to settle down on said narrow belts rather than moving above them.

10. The apparatus of claim 1 wherein said conveyor means comprises a flat conveyor inclined upwardly and rearwardly for support of a carton thereon.

11. The apparatus of claim 1 wherein along said conveyor means there are means for closing the top of said carton and receiving it in place.

12. Apparatus for lifting filled parallelepiped cartons with vertical side walls from an agricultural field, or the like, including in combination:

a wheel-supported main frame, a pickup device at the forward end of said frame comprising a pair of frame arms pivotally mounted to said main frame and supporting a pair of facing discs for rotation on two generally vertical planes that converge rearwardly and downwardly, said discs being spaced apart from each other a distance such that at their forward and upper portions they are further apart than the width of the carton to guide it into the space between them and, later, to enable release from them, and at their rear and lower portions they are slightly closer together than the width of the carton, to grip it, and resilient means between said frame arms and said main frame for yieldingly urging said discs towards each other, said discs having high friction faces for engaging said carton side walls, first driving means supported on said frame for rotating said discs, a gripping device supported by said frame to the rear of said pickup device and comprising a substantially coplanar pair of rotatable yieldable tired wheels filled with air at low pressure to provide said yielding, facing each other and inclined rearwardly upwardly and slightly closer together than the width of the carton, the tires providing high friction surfaces for engaging the carton side walls and yielding to prevent damage to the carton while gripping them firmly, the gripping device being located so that it positively takes away the carton from the pickup device and supports it while conveying it rearwardly and upwardly, second driving means supported on said frame for rotating said wheels so that their facing surfaces move upwardly and rearwardly, and conveyor means on said frame for receiving said carton from said gripping means and moving the carton upwardly and rearwardly therefrom.

13. The apparatus of claim 12 wherein said resilient means comprise air bags on the opposite side of said pivots from said arms.

14. The apparatus of claim 12 wherein said conveyor means comprises a rearwardly and upwardly inclined pair of vertical belts, each engaging an opposite side wall of said carton, and a supporting pair of narrow roller tracks also inclined upwardly and rearwardly and supporting a marginal portion of the bottom of the carton along each side thereof, the belts being spread apart at their forward ends to enable entrance and alignment of the cartons, and transition support means between said tired wheels and said conveyor means, comprising a pair of narrow, diverging driven conveyor belts for supporting portions of the bottom of the carton and guiding it up to said roller tracks, the space above said belts being open to enable said carton to settle down on said narrow belts rather than moving above them.

15. The apparatus of claim 14 wherein along said conveyor means there are means for closing the top of said carton and receiving it in place.

* * * * *